United States Patent [19]

Werner et al.

[11] Patent Number: 4,818,392
[45] Date of Patent: Apr. 4, 1989

[54] LIQUID WASTE TREATMENT SYSTEM

[75] Inventors: Roy H. Werner, Pittsburgh, Pa.; Randy A. Galgon, Lockport, N.Y.; Clifford J. Decker, Bethel Park, Pa.

[73] Assignee: Hazleton Environmental Products Inc., Hazelton, Pa.

[21] Appl. No.: 131,947

[22] Filed: Nov. 30, 1987

[51] Int. Cl.[4] .................. B01D 21/01; B01D 21/08; C02F 1/52
[52] U.S. Cl. .................. 210/195.3; 210/202; 210/208; 210/521; 210/740
[58] Field of Search .................. 210/138, 141, 142, 143, 210/197, 202, 205, 206, 207, 208, 521, 522, 533, 535, 740, 195.3

[56] References Cited

U.S. PATENT DOCUMENTS

| | | | |
|---|---|---|---|
| 1,518,136 | 12/1924 | Dorr | 210/740 |
| 3,807,560 | 4/1974 | Pentz et al. | 210/740 |
| 4,136,012 | 1/1979 | Louboutin et al. | 210/208 |
| 4,290,898 | 9/1981 | von Hagel et al. | 210/208 |
| 4,351,733 | 9/1982 | Salzer et al. | 210/521 |
| 4,474,477 | 10/1984 | Smith et al. | 366/165 |
| 4,526,687 | 7/1985 | Nugent | 210/208 |
| 4,579,655 | 4/1986 | Louboutin et al. | 210/197 |

FOREIGN PATENT DOCUMENTS 874099 10/1981 U.S.S.R. .................. 210/740

Primary Examiner—Richard V. Fisher
Assistant Examiner—Linda S. Evans
Attorney, Agent, or Firm—William J. Ruano

[57] ABSTRACT

A method of treating and progressively densifying liquid waste. It comprises thoroughly mixing and aerating by a continuous mixer and/or aerating raw water and chemical treating materials, discharging the resulting mixture downwardly into a reaction compartment, thence drawing the resulting material upwardly by means of an impeller and gravity flow, then allowing a portion of the resulting denser sludge to descend downwardly by gravity into a floc tunnel, thence in a horizontal portion, further densifying and separating takes place. The remaining portion is directed horizontally against inclined, closely spaced parallel plates to clear the resulting fines mixture. Thereafter, there is still further densifying of the sludge. By this method, a very dense sludge is obtained in a relatively small space.

2 Claims, 5 Drawing Sheets

LIQUID WASTE TREATMENT SYSTEM

This invention relates to a liquid waste treatment system for raw water or sludge.

BACKGROUND OF THE INVENTION

In the past, liquid waste treatment systems comprised a number of separate facilities for effecting different processes, involving very high cost and extensive land sites.

SUMMARY OF THE INVENTION

An object of the present invention is to overcome the above-named disadvantages of existing liquid waste treatment systems by providing a compact, unitary construction completely enclosed in a single building or module wherein the various steps of treatment are contained in separate compartments which adjoin each other and which steps constitute substantial improvements.

DETAILED DESCRIPTION OF THE DRAWINGS

DETAILED DESCRIPTION OF THE PREFERRED EMBODIMENT

Figure 1:
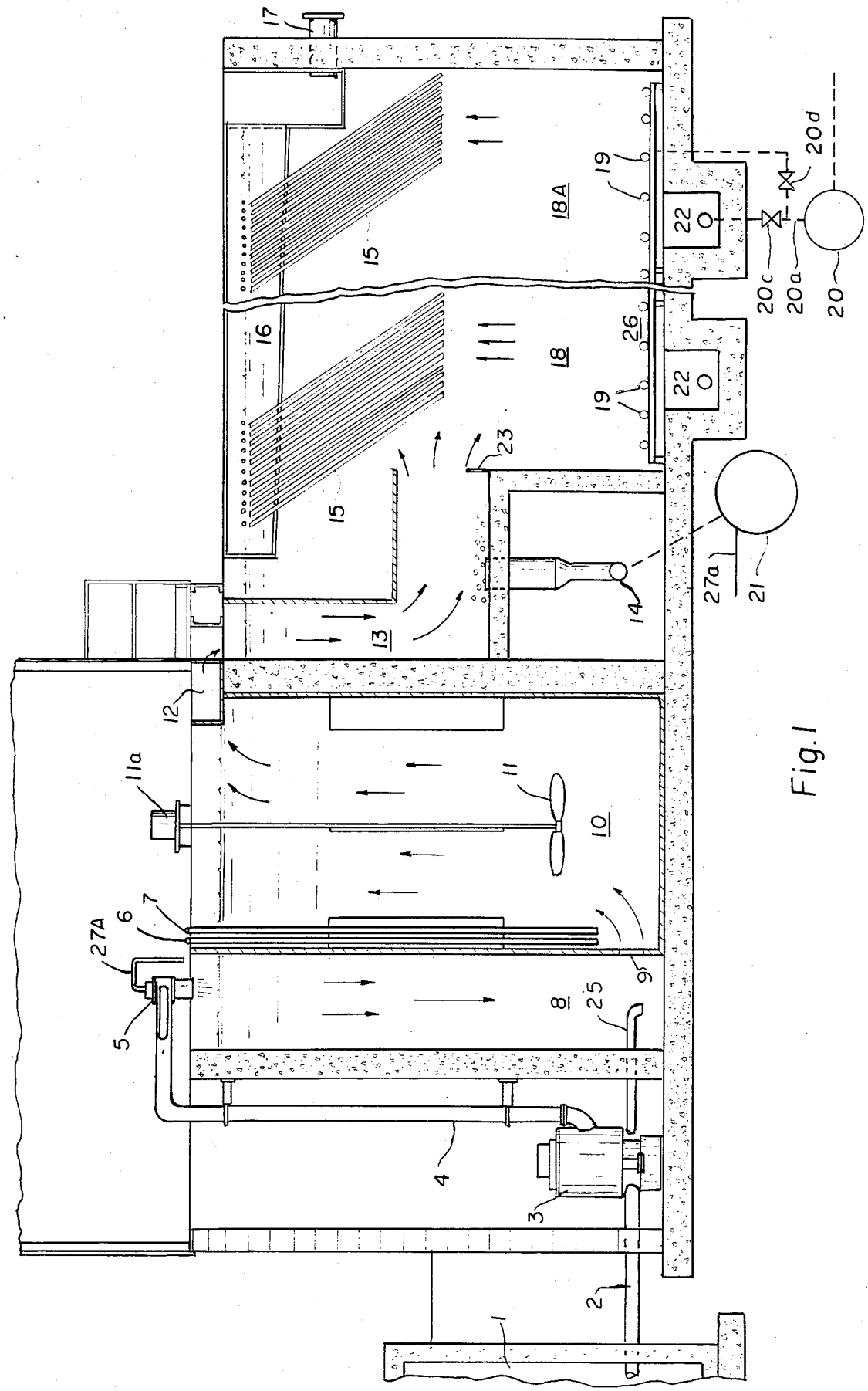
FIG. 1 is an elevational view, in vertical cross-section of a liquid waste treatment system embodying the present invention.
Figure 2:
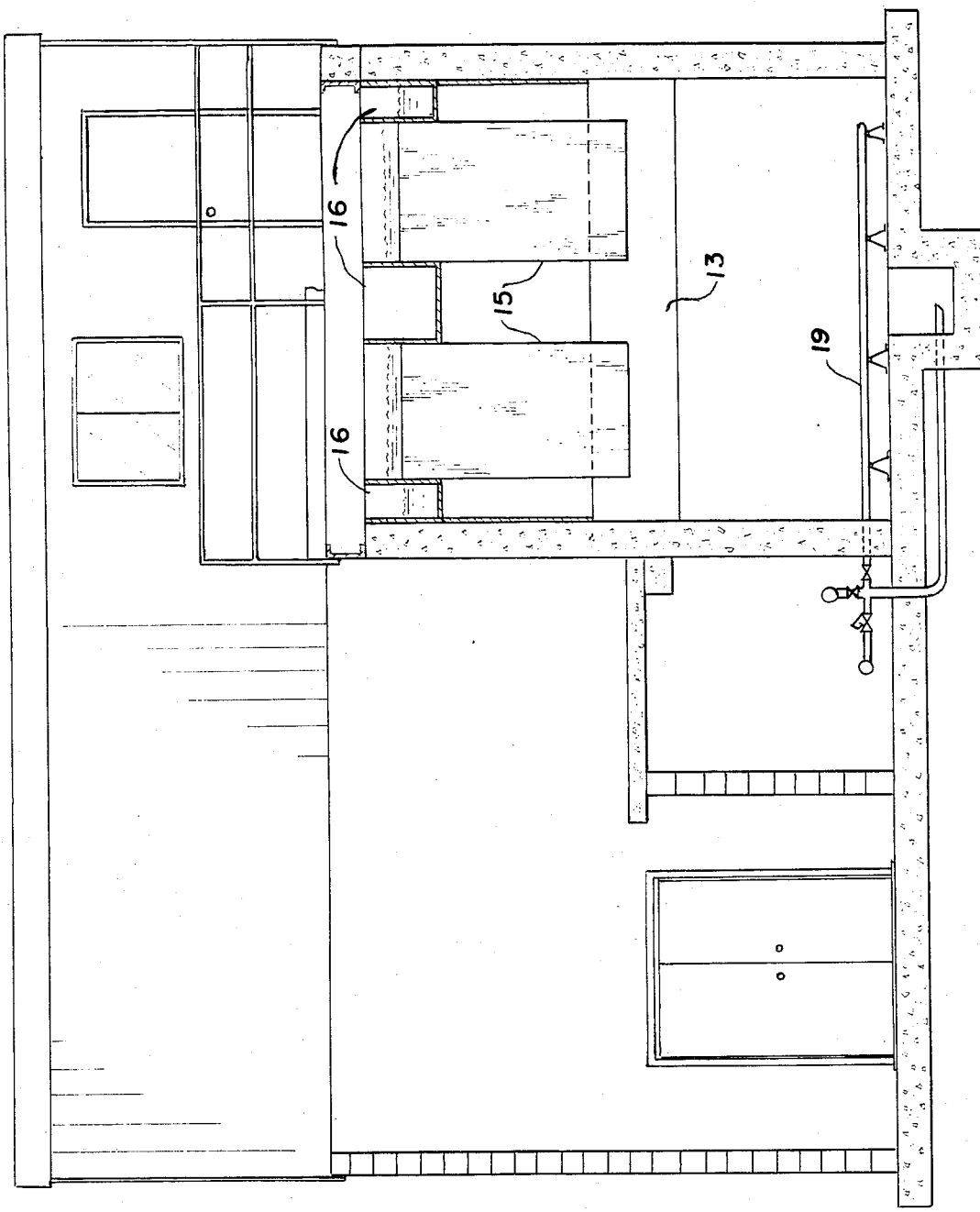
FIG. 2 is a transverse cross-section taken at the right of FIG. 1.

Referring more particularly to FIG. 1 of the drawings, numeral 1 denotes a waste water storage or impoundment which is pumped by means of pump 3 through pipes 2 and 4 to a mixer 5, often referred to by applicant's trademark Turbo-Jett. Alternatively, such raw water or waste water could be introduced into the mixer 5 by static head pressure.

The function of mixer 5 is for mixing of reagents from reagent pump 27 and pipes 27a (FIG. 3a) connected to the reagent storage tank 24a and pump 24 and/or aeration as will be described more fully hereinafter. Although most reaction takes place in the mixer, additional reaction takes place in the reaction area 8 from which the mix leads through opening 9 leading to the bottom of a floc tube 10. Lime slurry caustic or other neutralizing chemicals are pumped by reagent pump 27 through pipes 27a to the mixer inlet, the mixer 5 being capable of diffusing the chemical over the full area of the bore of the mixer. A typical mixer is shown in Roy H. Werner Patent Application Ser. No. 07/103,541 filed Sept. 28, 1987 and in U.S. Pat. No. 4,474,477 dated Oct. 2, 1984.

Polymer introduction takes place through pipe 6 at the bottom of floc tube 10 at which precipitates come in intimate contact with the polymers. At the same time, a proportion of the sludge can be recycled back for re-treatment in mixer 5 through inlet line 25.

The other portion of the solids continues to grow in size and density as they flow up through the floc tube 10 by mens of impeller 11 driven by a motor 11a, or by any other means for mechanically inducing upward current and/or gravity flow.

Once the solids enter upper horizontal conduit 12 and move downwardly and horizontally in floc tunnel 13, the growth of the size and density of the solids continues to take place along with primary separation of water from solids once the slurry reaches the vertically adjustable baffle portion 23 of the floc tunnel, which tunnel serves as a particle classifier. Reseeding or reintroduction of the sludge to any preceding area of treatment is possible by means of inlet drain or suction line 14 of sludge recirculating pump 21 which draws sludge in a downward direction and redistributes it to the desired location. The suction of the pump 21 is connected to the bottom of the floc tunnel through line 14. The discharge of pump 21 pumps to the inlet of the mixer 5 through pipes 27a and 7 and/or bottom of the floc tube 10.

Beyond the end of the horizontal portion of the floc tunnel, vertically and angularly inclined settling plates 15 aid natural gravity type settling through directing the solids downwardly through area 18–18A towards the sludge removal system. The semi-clear water is directed outwardly and upwardly for further processing and clarification in the inclined plates 15. The fine particles move upwardly through area 18 and 18A to be settled through area of settling plates 15. Once the fine particles are removed, the clear water enters collector trough 16 and passes out of the system through discharge pipe 17.

The concentrated sludge settles through 18 and 18A areas downwardly towards the sludge removal area and is then sent for disposal or further processing by the sludge removal system 26. Recycling sludge from the sludge removal area to any previous portion of the system is possible.

The sludge removal system 26 comprises a piping network 19 of a multiplicity of parallel pipes supported on a plurality of supports for spacing the piping network from the floor surface. The piping network 19 is connected to the suction side 20b of a pump 20 (FIG. 3a) having a valve 20d (FIGS. 1 and 3a) so as to suck sludge into the network through inlet orifices, preferably at the bottom of the pipes and preferably spaced at 2 or 3 feet apart. Pump 20 has an outlet 20a. The pipes may be made of metal, fiberglass, or plastic material.

Figure 3A:
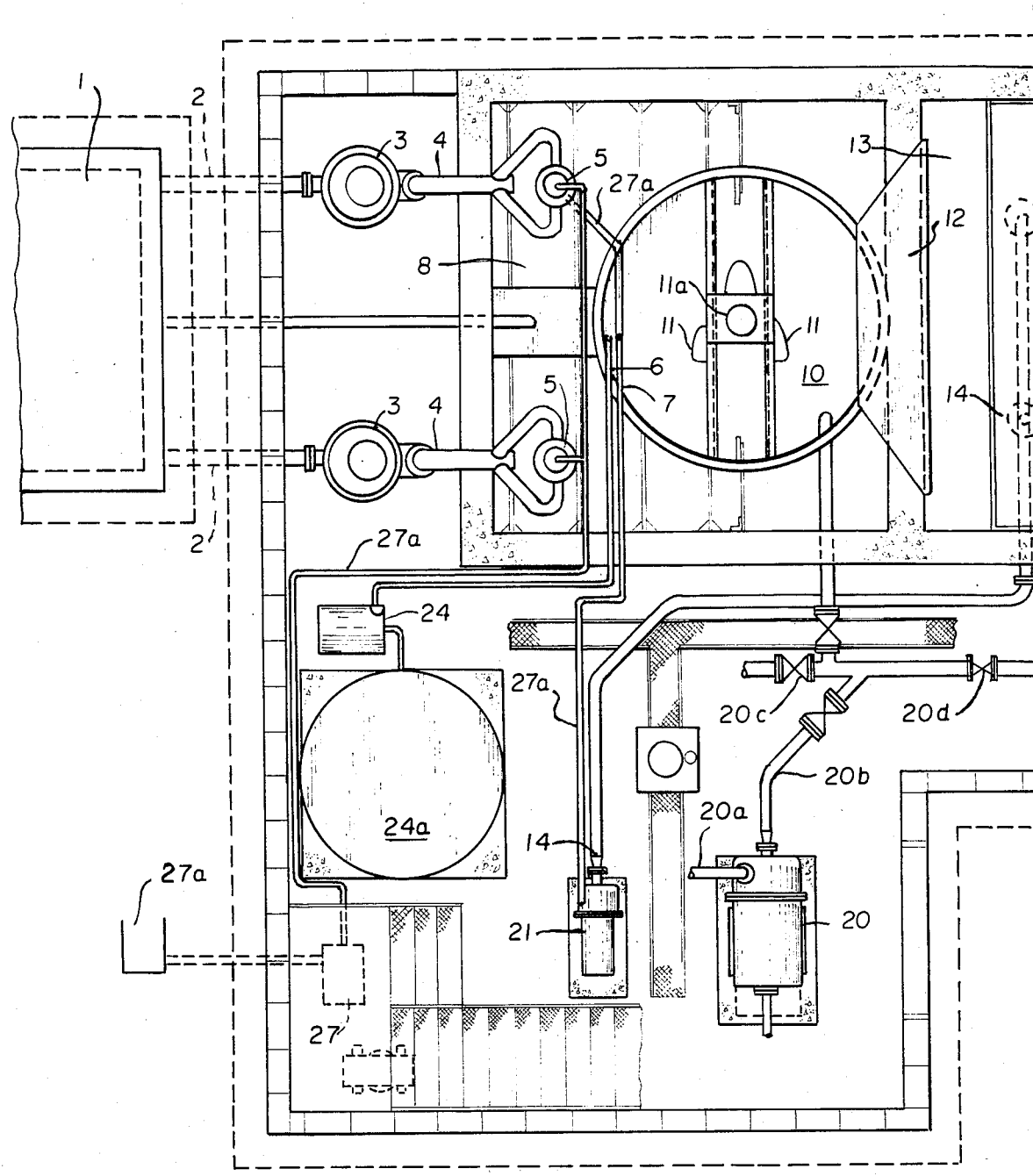
FIGS. 3a and 3b are top partial views.
Figure 3B:
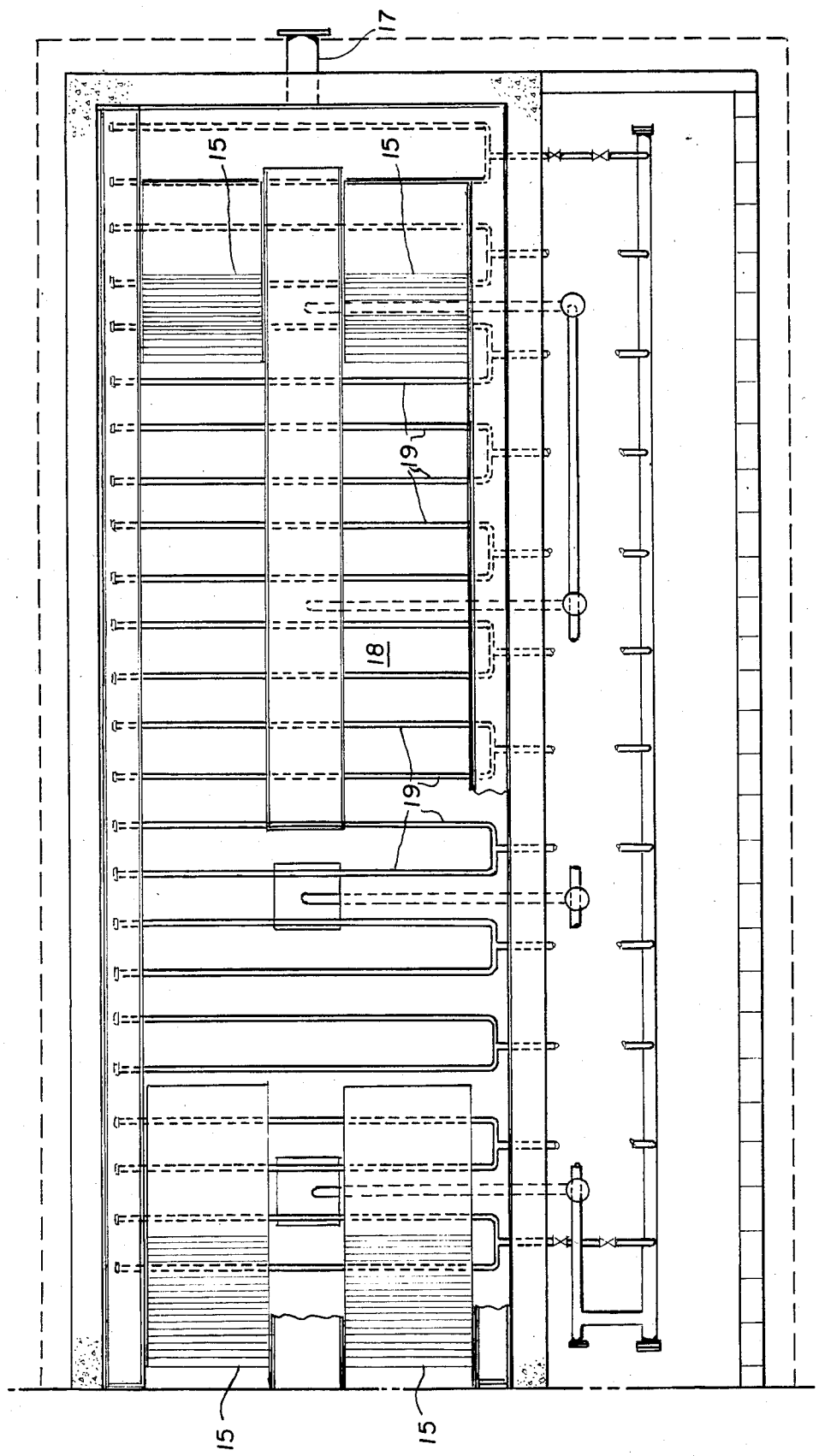
Figure 3C:
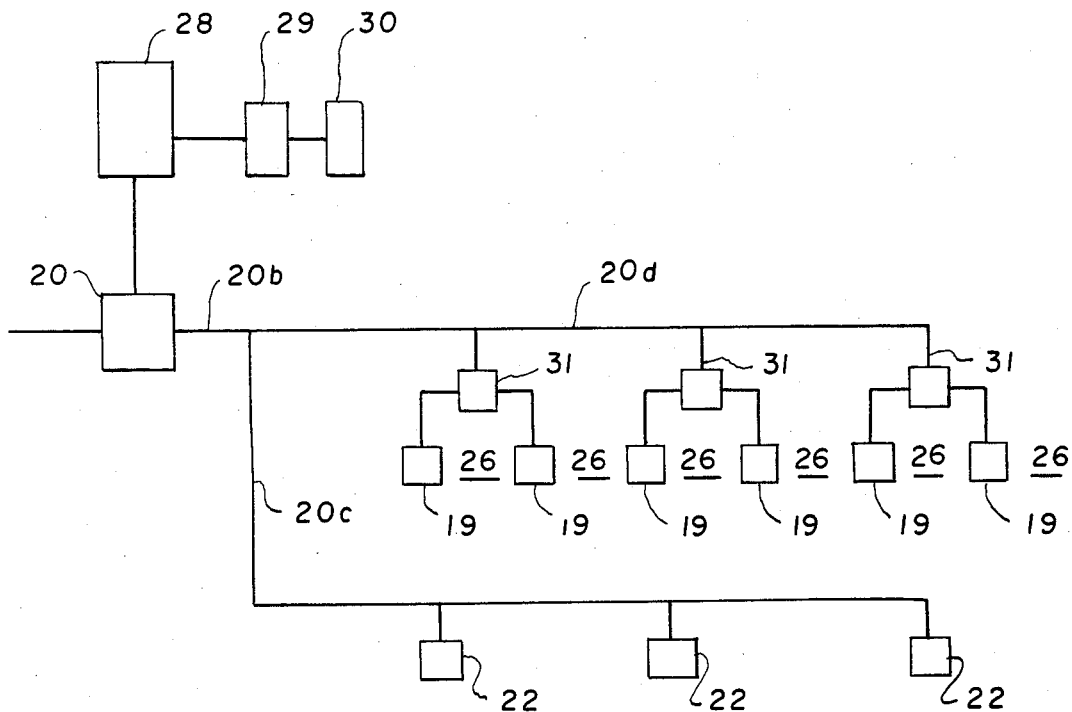
FIG. 3c is a control system.

While the entire network of pipes may be connected directly to the suction pump, it is preferred instead, as shown in FIG. 3c, by means of a control panel 28, density meter 29 and timer 30, to partition the pipes into segments, each leading to a separate control valve 31, thence to the suction side of sludge, backflash or recycle pump 21 (FIG. 3a). By manually, or preferably electrically controlling the respective control valves, such as by a timer 30 or sludge density measurement device, a sludge withdrawal pattern that more closely matches the pattern of the settled sludge is obtained. Each valve 31 in the settling area may be programmed to open for a different length of time by fully automatic control operation. Thus, sequential operation of the control valves selectively connects the pump suction to various segments of the pipe. Oversized particles or foreign material discarded in the settling area remain in place on the bottom of the basin until withdrawn from the floor drains 22 through valve 20c. The sludge system described including network 19 does not force oversized material into the pump inlet such as to cause system blockage or damage to the sludge removal system. Even if some of the orifices become blocked, there are sufficient inlets to permit continued operation with minimal change in efficiency. Backflushing would remove oversize particles from orifices to be withdrawn with floor drain 22. Even though segment inlets are at varying distances from the suction source, the orifices are small in comparison with the piping so that the flow rate into each orifice is controlled by the orifice size.

Thus it will be seen that a highly efficient and compact liquid waste system has been provided which occupies only a fraction of the space of present liquid waste systems at a fraction of the cost.

While we have illustrated and described a single specific embodiment of our invention, it will be understood that this is by way of illustration only and that various changes and modifications may be contemplated in our invention within the scope of the following claims.

We claim:

1. Apparatus for treating water in a structure having a plurality of adjoining compartments, said structure comprising: a first compartment, inlet means for introducing and mixing means for continuously mixing raw water, air, and chemical treating agents at the top of said first compartment so as to move the mixture downwardly through a reaction area in said first compartment, a second compartment, a partition between the first and second compartments having means defining a bottom opening through which mixture is led from the bottom of said first compartment to the bottom of the adjoining second compartment by means of gravity, a third compartment, an impeller fan in said second compartment for hydraulically aiding the lifting through gravity flow of material from the bottom to the top of said second compartment, thence to the top of said third compartment, a floc tunnel in said third compartment for classifying sludge particles, a sludge removing apparatus in said third compartment for progressively densifying the sludge, and discharge means for clarified water together with a vertical baffle in said third compartment at the end of a horizontal settling passageway prior to said sludge removing apparatus, whereby some large solids are accumulated to trap small size solids, and a recycle pump for removing said small size solids and seeding the incoming mixture at the top of the first compartment.

2. Apparatus as recited in claim 1, wherein said sludge removing apparatus is at the bottom of said third compartment and comprises a network of pipes which are perforated and supported in space relation on a floor of said third compartment, and a pump connected to said pipe network for further removing sludge from the third compartment.

* * * * *